United States Patent
Kim (10) Patent No.: US 8,564,682 B2
(45) Date of Patent: Oct. 22, 2013

(54) METHOD FOR CREATING CONTENT USING A CAMERA OF A PORTABLE TERMINAL AND A PORTABLE TERMINAL ADAPTED THEREFOR

(75) Inventor: Jeong Yun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 182 days.

(21) Appl. No.: 12/817,757

(22) Filed: Jun. 17, 2010

(65) Prior Publication Data

US 2010/0321534 A1    Dec. 23, 2010

(30) Foreign Application Priority Data

Jun. 19, 2009  (KR) .................. 10-2009-0055159

(51) Int. Cl.
*H04N 5/228* (2006.01)
*H04N 5/222* (2006.01)

(52) U.S. Cl.
USPC ............. 348/222.1; 348/333.05; 348/169; 348/14.07; 725/105

(58) Field of Classification Search
USPC ............. 348/333.05, 333.12, 222.1, E5.053; 725/105
See application file for complete search history.

(56) References Cited

U.S. PATENT DOCUMENTS

| | | | |
|---|---|---|---|
| 6,184,926 B1 * | 2/2001 | Khosravi et al. | 348/239 |
| 6,400,374 B2 * | 6/2002 | Lanier | 345/630 |
| 6,621,524 B1 * | 9/2003 | Iijima et al. | 348/584 |
| 6,674,485 B2 * | 1/2004 | Akiyama et al. | 348/586 |
| 6,757,086 B1 * | 6/2004 | Mori et al. | 359/25 |
| 7,502,527 B2 * | 3/2009 | Momose et al. | 382/284 |
| 8,035,657 B2 * | 10/2011 | Vau et al. | 345/629 |
| 2002/0027600 A1 * | 3/2002 | Yamanaka et al. | 348/208 |
| 2002/0122605 A1 * | 9/2002 | Chang | 382/284 |
| 2003/0214600 A1 * | 11/2003 | Kido | 348/362 |
| 2004/0227836 A1 * | 11/2004 | Tanaka | 348/333.11 |
| 2005/0036044 A1 * | 2/2005 | Funakura | 348/239 |
| 2005/0219384 A1 * | 10/2005 | Herberger et al. | 348/239 |
| 2006/0125928 A1 * | 6/2006 | Wolcott et al. | 348/211.2 |
| 2006/0176388 A1 * | 8/2006 | Kinjo | 348/333.01 |
| 2006/0197851 A1 * | 9/2006 | Vlahos | 348/239 |
| 2007/0057866 A1 * | 3/2007 | Lee et al. | 345/1.1 |
| 2008/0042812 A1 * | 2/2008 | Dunsmoir et al. | 340/435 |
| 2009/0066513 A1 * | 3/2009 | Kondo et al. | 340/572.1 |
| 2009/0153666 A1 * | 6/2009 | Takeuchi et al. | 348/169 |
| 2009/0154799 A1 * | 6/2009 | Tsukada | 382/165 |

FOREIGN PATENT DOCUMENTS

| | | |
|---|---|---|
| KR | 1020050106588 | 10/2005 |
| KR | 1020080091631 | 10/2008 |

* cited by examiner

*Primary Examiner* — Hung Lam (74) *Attorney, Agent, or Firm* — The Farrell Law Firm, P.C.

(57) ABSTRACT

A method for creating content and a portable terminal adapted therefor. An image is selected. The camera captures an image of at least one object from within an image currently being received by the camera. New content is created by combining the captured image of the at least one object with the selected image.

18 Claims, 7 Drawing Sheets

METHOD FOR CREATING CONTENT USING A CAMERA OF A PORTABLE TERMINAL AND A PORTABLE TERMINAL ADAPTED THEREFOR

PRIORITY

This application claims priority to an application that was filed in the Korean Intellectual Property Office on Jun. 19, 2009 and assigned Serial No. 10-2009-0055159, the content of which is incorporated herein by reference.

BACKGROUND OF THE INVENTION

1. Field of the Invention

The present application relates generally to a content creating method, and more particularly, to a method that, in real time, combines an image selected by a user, with an image captured via a camera, to create new content in a portable terminal, and also to the portable terminal for performing the method.

2. Description of the Related Art

Conventional portable terminals provide a number of functions, including, for example, a function for downloading content via the Internet and functions for capturing moving or still images via cameras included in the portable terminals. Additionally, the conventional portable terminals can transmit the captured images or stored data via a Multimedia Messaging Service (MMS).

With the increased interest in User Created Content (UCC), there is also an increased desire of users to create their own unique content using conventional portable terminals and to share them with others. In order to create content, a user commonly uses an input device, such as a stylus pen, a mouse, etc.

The stylus pen is used for a drawing function in a portable terminal having a touch screen function. That is, the portable terminal with a touch screen panel receives a user input generated when the stylus pen is moved on the touch screen panel.

The mouse is used to execute a graphic tool in a Personal Computer (PC). The PC provides a variety of options according to the graphic tool used by the user and performs most editing processes based on the mouse input.

For example, if the user selects an image for editing, selects a color and line thickness, etc., and then draws on the touch screen panel using a stylus pen or a virtual mouse, the portable terminal shows a line with the selected thickness in the selected color according to the motion of the stylus pen or a virtual mouse. The drawn line or object can be deleted via a cancel function, etc., or altered with other colors.

The method for creating content using a stylus pen or a virtual mouse, however, is not natural, compared with painting using a real pen or a real brush.

Further, the virtual content creating method has a limitation in expressing a person's handwriting style or painting style in the same way as it is expressed on paper.

Additionally, if a digital device does not have a touch screen interface, its content cannot be edited using the stylus pen.

Recently, because portable terminals have become smaller, in order to provide portability, their touch panel size has also decreased. Consequently, a user of a small sized terminal cannot freely express himself/herself on a touch screen panel thereof using only a relatively small stylus pen.

SUMMARY OF THE INVENTION

The present invention has been designed to address at least the above-identified problems, and to provide at least the advantages described below.

An aspect of the present invention is to provide a method and apparatus that can alter images stored in a portable terminal, according to a user's purpose, to create new content, using a camera included in the portable terminal.

Another aspect of the present invention is to provide a method and apparatus that, in real time, combines an image selected by a user, with an image captured via a camera, to create new content in a portable terminal.

In accordance with an aspect of the present invention, a method for creating content in a portable terminal is provided. The method includes operating a camera, displaying a image selected by a user on a preview screen if a content composite mode is activated, capturing at least one object detected by the camera if the particular image is displayed, and creating new content by combining an image of the captured at least one object with the selected image.

In accordance with another aspect of the present invention, a portable terminal is provided. The portable terminal includes a camera unit for capturing at least one object, a display unit for displaying, if a content composite mode is activated, a user's selected image on a preview screen and at least one object captured by the camera unit, at one side of the preview screen, and a controller for creating new content by combining an image of the captured at least one object with the selected image.

BRIEF DESCRIPTION OF THE DRAWINGS

The above and other aspects, features, and advantages of the present invention will become more apparent from the following detailed description in conjunction with the accompanying drawings, in which.

DETAILED DESCRIPTION OF EMBODIMENTS OF THE INVENTION

Hereinafter, various embodiments of the present invention will be described in detail with reference to the accompanying drawings. The same reference numbers are used throughout the drawings to refer to the same or similar parts. Additionally, detailed descriptions of well-known functions and structures incorporated herein may be omitted to avoid obscuring the subject matter of the present invention.

Although the present invention is described below with reference to a portable terminal with a camera interface, it will be appreciated that the present invention is not limited to this specific embodiment. For example, the present invention is applicable to all information communication devices, multimedia devices, and their applications, such as, a mobile communication terminal, a mobile phone, a Personal Digital Assistant (PDA), a smart phone, an International Mobile Telecommunication 2000 (IMT-2000) terminal, a Code Division Multiple Access (CDMA) terminal, a Global System for Mobile communication (GSM) terminal, a Wideband Code Division Multiple Access (WCDMA) terminal, a High Speed Downlink Packet Access (HSDPA) terminal, a World interoperability for microwave access (Wimax) terminal, a Universal Mobile Telecommunication Service (UMTS) terminal, etc.

Figure 1:
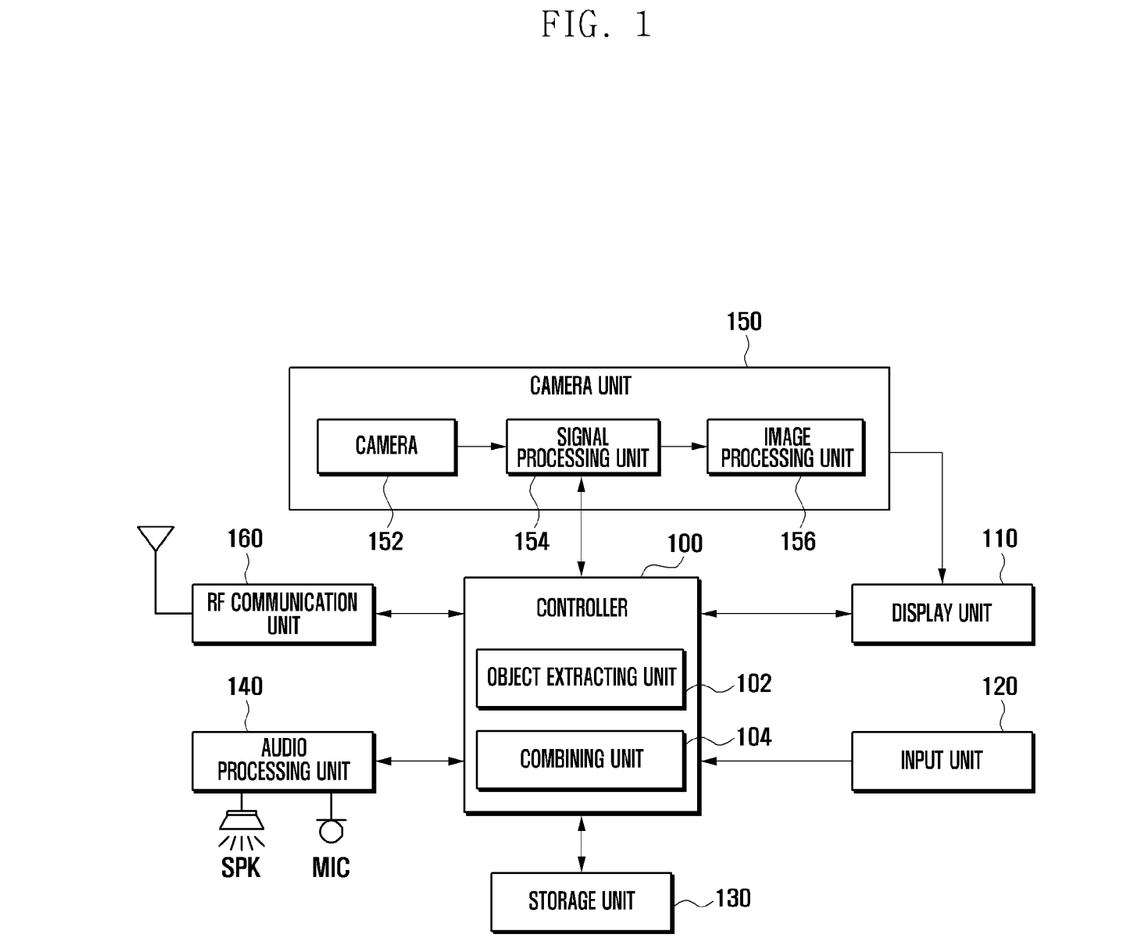
FIG. 1 is a diagram illustrating a portable terminal according to an embodiment of the present invention.

FIG. 1 is a diagram illustrating a portable terminal according to an embodiment of the present invention.

Referring to FIG. 1, the portable terminal includes a display unit 110, an input unit 120, a storage unit 130, an audio processing unit 140, a camera unit 150, a Radio Frequency (RF) communication unit 160, and a controller 100.

The display unit 110 displays images output from an image processing unit 156 of the camera unit 150. The display unit 110 also displays image data output from the controller 100, user data requested by a user, additional function screens, etc. In accordance with an embodiment of the present invention, the display unit 110 may be implemented with a Liquid Crystal Display (LCD). It should be understood, however, that the present invention is not limited to the embodiment. For example, the display unit 110 may also be implemented with an Organic Light Emitting Diode (OLED) display.

If a camera function is executed in the portable terminal, the display unit 110 displays menu screens to select one mode from among the camera modes. If a content composite mode is selected, the display unit 110 displays, on the screen, an image stored in the storage unit 130, and displays, on an auxiliary screen, an object recognized by the camera unit 150. For example, the auxiliary screen may overlap a portion of the screen or the auxiliary screen and screen may be positioned side to side. Thereafter, if the user selects the object, the display unit 110 displays new content by combining the selected image with the recognized object.

The input unit 120 includes a plurality of input keys and function keys for inputting numerical or alphabetical information and setting a variety of functions. The function keys include direction keys, side keys, shortcut keys, etc., which are set to perform specific functions. The input unit 120 outputs the key signals, which are related to the user's settings and the function control of the portable terminal, to the controller 100. In particular, the input unit 120 includes function keys corresponding to commands for selecting an image and a composite mode.

The storage unit 130 stores an Operating System (OS) for booting the portable terminal and applications programs related to various functions, such as a file playback function, a camera function, etc. The storage unit 130 also stores user data generated while the portable terminal is operating. Accordingly, the storage unit 130 is configured to include a program storage area and a data storage area.

The program storage area stores application programs for supporting the functions described above. For example, if the user requests activation of a function, a corresponding application program executes the function under the control of the controller 100.

In accordance with an embodiment of the present invention, the program storage area further stores a program for identifying and extracting an object according to a hue recognition method, a program for identifying and extracting an object according to a plane recognition method, a program for combining an image selected by the user with an image capturing an object via the camera unit 150, etc., such that the user can select a content composite mode.

The data storage area stores a variety of data, for example, data generated when the application programs are executed, user input data, phone book data, etc. In accordance with an embodiment of the present invention, the data storage area also stores images to be used in the content composite mode and content created via the content composite mode.

The audio processing unit 140 plays back audio signals transmitted from the controller 100, via a speaker (SPK). The audio processing unit 140 also receives audio signals, such as voice signals, via a microphone (MIC), and outputs them to the controller 100. That is, the audio processing unit 140 converts voice/audio data into audible sound signals and then outputs them via the SPK under the control of the controller 100. The audio processing unit 140 converts audio signals received via the MIC, such as voice signals, into digital data and then outputs them to the controller 100. In accordance with an embodiment of the present invention, the audio processing unit 140 can output a sound effect generated during the content composite mode, under the control of the controller 100.

The RF communication unit 160 transmits/receives signals related to communication of the portable terminal, Short Message Service (SMS) or Multimedia Message Service (MMS), a voice call, data communication, etc. The RF communication unit 160 converts voice/audio data and control data into RF signals and transmits them. Additionally, the RF communication unit 160 receives RE signals and converts them into voice/audio data and control data. Therefore, the RF communication unit 160 includes an RF transmitter for up-converting the frequency of transmitted signals and amplifying the transmitted signals and an RF receiver for low-noise amplifying received RF signals and down-converting the frequency of the received RF signals. In accordance with an embodiment of the present invention, the RF communication unit 160 transmits the combined content to other users using MMS or via short range wireless communication, for example, Bluetooth® communication, Infrared Data Association (IrDA)® communication, etc. Through this function, portable terminal users can share their content with others and also post content on their webpages, blogs, etc.

The camera unit 150 provides a camera function to the portable terminal. The camera unit 150 includes a camera 152, a signal processing unit 154, and an image processing unit 156. The camera 152 includes a camera sensor that captures an object and coverts the captured optical signals into electrical analog signals. In accordance with an embodiment of the present invention, the camera sensor is implemented with a Charge-Coupled Device (CCD) sensor. The signal processing unit 154 converts the analog electrical signals, which are output from the camera sensor 152, into digital image signals. The analog electric signals correspond to a still image and/or a moving image. In accordance with an embodiment of the present invention, the signal processing unit 154 includes a Digital Signal Processor (DSP).

The image processing unit 156 generates screen data to display the digital image signals output from the signal processing unit 154. That is, the image processing unit 156 transmits the digital image signals to the display unit 110, while conforming to the standard of the display unit 110, under the control of the controller 100. The image processing unit 156 also performs image compression and decompression.

In accordance with an embodiment of the present invention, the camera unit 150 transfers the image data received via the camera 152, to the display unit 110, under the control of the controller 100, thereby displaying an image corresponding to the image data using the display unit 110. The camera unit 150 can capture a particular object in a capture mode, under the control of the controller 100. The signal processing unit 154 can transfer data regarding an object, recognized via the camera 154, to an object extracting unit 102 of the controller 100.

The controller 100 controls the entire operation of the portable terminal and signal flows among the elements in the portable terminal. In particular, if the controller 100 detects a camera function execution signal, it operates the camera unit 150. If a composite mode is selected during the execution of the camera function, the controller 100 activates a content composite function and displays image data received via the camera unit 150 on a preview screen. Thereafter, the controller 100 identifies a particular image selected by a user and controls the display unit 110 to display the identified image. In addition, when the particular image has been selected, the controller 100 may stop displaying the image data on the preview screen.

The controller 100 can control the camera unit 150 to overlay an image regarding an object currently recognized via the camera unit 150, on an auxiliary screen, so that the object image can be displayed together with the particular image. The controller 100 can execute a passive or automatic mode to capture the object. The passive mode allows a user to select an object from among objects recognized via the camera unit 150. In the automatic mode, the camera unit 150 automatically recognizes objects and one of the recognized objects is automatically selected.

The controller 100 can determine an edge of an object according to the pixel compactness via the camera unit 150 in the passive or automatic mode, and then extracts a particular object. That is, after the controller 100 analyzes data transferred from the camera unit 150, it identifies a portion of analyzed data having large pixel compactness as an edge of a corresponding object and a portion of analyzed data having small pixel compactness as a portion inside the edge of a corresponding object. Thereafter, the controller 100 commands the combining unit 104 to combine an image of the particular object with the particular image.

The controller 100 displays content created as an image of the particular object combined with the particular image on the preview screen, according to a user's selected signal of the particular object. Thereafter, the controller 100 stores the created content in the storage unit 130. The controller 100 can also perform an operation to re-capture another object or to change an image, according to a request to modify the content.

In accordance with an embodiment of the present invention, the controller 100 can control the RF communication unit 160 to transmit the content to other users by MMS or via short-range wireless communication, such as Bluetooth® or IrDA® communication.

The controller 100 may also include an object extracting unit 102 and a combining unit 104 for efficiently performing the functions described above.

The object extracting unit 102 can extract an object from an image received via the camera unit 150, using a plane recognition mode or a hue recognition mode, when a composite mode is selected. The plane recognition mode refers to a mode where the object extracting unit 102 detects the compactness of pixels corresponding to an edge portion of each object received by the camera unit 150 and then recognizes a particular object. The hue recognition mode refers to a mode where the object extracting unit 102 recognizes characters, etc., via hue of each object recognized by the camera unit 150. The object extracting unit 102 can distinguish a particular hue appearing on the preview screen from a preset hue and extract an object corresponding to the hue.

The combining unit 104 combines an image selected by a user with an image of the particular object extracted by the object extracting unit 102. That is, the combining unit 104 performs an image processing to overlay the image of the particular object on the user's selected image.

In accordance with an embodiment of the present invention, the controller 100 can extract feature points of an image recognized via the camera unit 150 in order to match the size of a particular image selected by the user with the size of the background image where the particular object is located. If a composite mode is selected during the camera mode, the controller 100 detects the feature points of an image received via the camera unit 150 and maps the size of the particular image on the feature points, thereby displaying the particular image on the screen. The feature points may be a plurality of edge points contained in a background image where a particular object, which is recognized by the camera, is located. The particular object may be located in a preset place, such as on a simple-colored table or in a certain size of paper.

Figure 2:
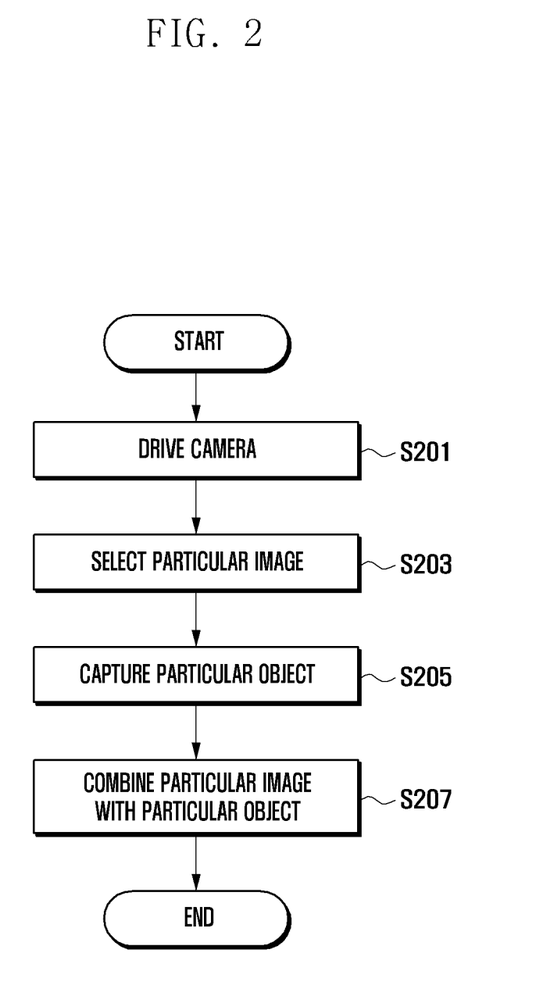
FIG. 2 is a flow chart illustrating a basic method for creating content in a portable terminal, according to an embodiment of the present invention.

FIG. 2 is a flow chart illustrating a basic method for creating content in a portable terminal, according to an embodiment of the present invention.

Referring to FIG. 2, the portable terminal combines an image of an object recognized by the camera with a user's selected image to create a new content. Accordingly, it is preferable that the portable terminal supports an image processing function to perform an image composite, a function to identify and extract an object, and a function to identify a particular object according to hue.

More specifically, the portable terminal operates a camera function according to a user request in step S201. The portable terminal may activate a function to combine a particular image with an image of an object recognized by the camera unit 150, according to whether a composite mode is selected.

When a composite mode has been selected while the camera is being driven, the portable terminal identifies a particular image selected by the user in step S203. For example, the portable terminal may display a list of images, which were previously stored in the storage unit 130, on the screen, and then displays a selected image from the list on a preview screen.

When the particular image is selected and displayed, the portable terminal captures a particular object in step S205. More specifically, the portable terminal may use a plane recognition function or a hue recognition function to distinguish the particular object from an image currently being received through the camera unit 150. That is, the controller 100 can distinguish objects in a plane recognition mode or a hue recognition mode. In the plane recognition mode, the controller 100 determines the compactness of pixels corresponding to an edge portion of each object recognized via the camera unit 150 and then recognizes the objects. Alternatively, in the hue recognition mode, the controller 100 recognizes characters, etc., via a hue of each object recognized via the camera unit 150. When the portable terminal has recognized the particular object, it displays an image of the particular object on an auxiliary screen. As described above, the auxiliary screen may overlap a portion of the screen, or the auxiliary screen and screen may be positioned side to side. The portable terminal can capture the particular object according to a user's input signal.

In step S207, the portable terminal combines the selected particular image with the image of the captured object to create new content.

As described above, in accordance with an embodiment of the present invention, the portable terminal displays a previously stored image, and then captures a particular object from an image currently being viewed via camera unit 150, in order to combine the particular object with the previously stored image, thereby creating new content. That is, the portable terminal is able to capture a particular object from an image currently being viewed via camera unit 150, in real time, without having to first store two separate images, and then remove an object from one of the stored images and superimpose the removed object in the other stored image.

During the image combining process, the portable terminal overlays the image of the captured object on the particular image on the screen. The portable terminal can display the created content on a preview screen and also store it in the storage unit 130. The portable terminal can combine, in real time, the image of the captured particular object with the particular image. That is, the portable terminal can combine, in real time, an image of a particular object, recognized by the camera unit 150, with the selected image, in response to changes in the image of a particular object. For example, the user can freely change the position where images will be combined, by altering the location of the portable terminal or by moving the position of an object.

The portable terminal can transmit the content created through the composite process to others, for example, by MMS or via short-range wireless communication.

In accordance with an embodiment of the present invention, the portable terminal can extract the feature points of an image recognized via the camera unit 150 in order to match the size of a particular image selected by the user with the size of the background image where the particular object is located. If a composite mode is selected during the camera mode, the portable terminal detects the feature points of an image recognized via the camera unit 150 and maps the size of the particular image on the feature points, thereby displaying the particular image on the screen. The feature points may be a plurality of edge points included in a background image where a particular object, recognized by the camera, is located. The particular object may be located in a preset place, such as on a simple-colored table or on a piece of paper.

Figure 3:
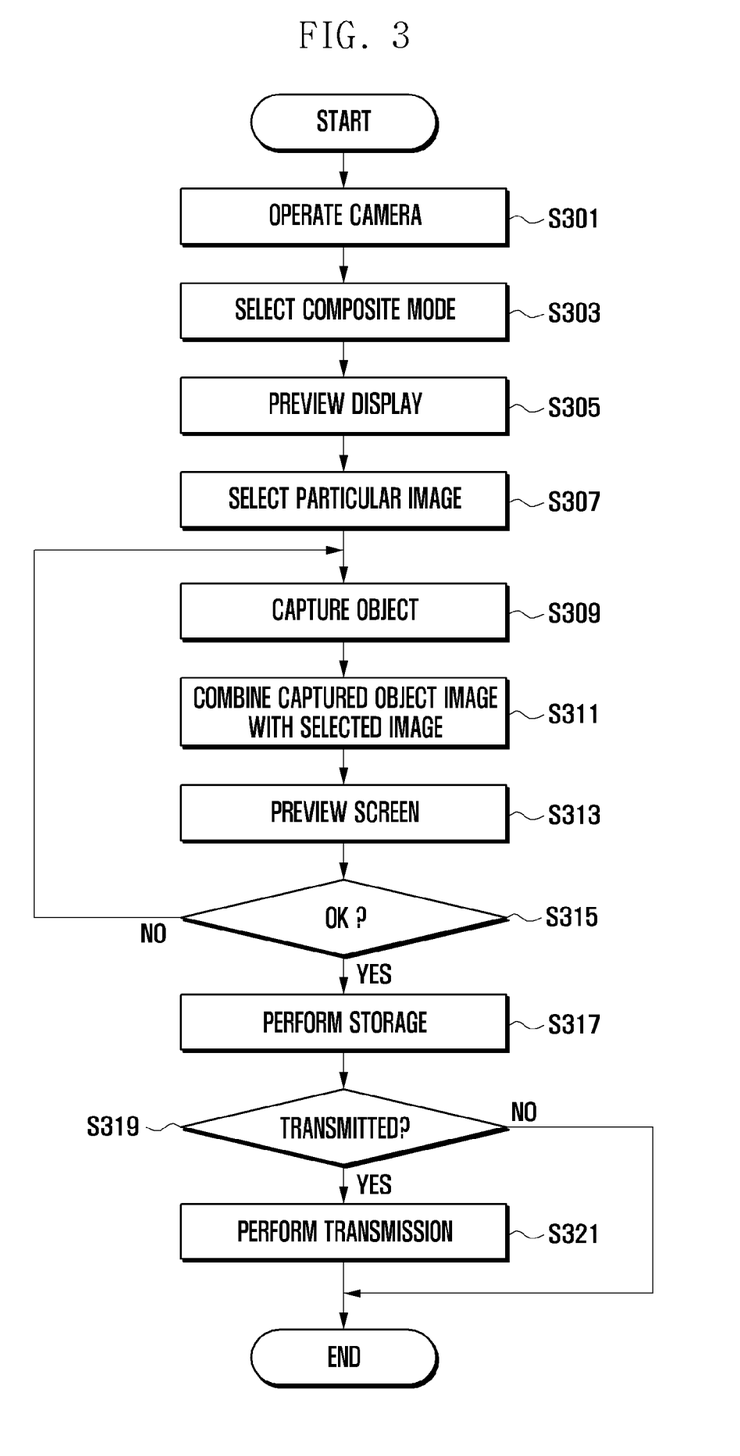
FIG. 3 is a flow chart illustrating a more detailed method for creating content in a portable terminal, according to an embodiment of the present invention.

FIG. 3 is a flow chart illustrating a more detailed method for creating content in a portable terminal, according to an embodiment of the present invention. Additionally, FIGS. 4 to 10 are screens illustrating a method for creating content according to an embodiment of the present invention.

Figure 4:
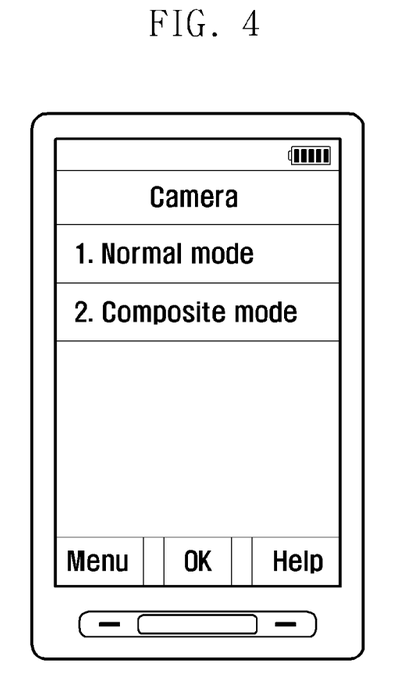
FIGS. 4 to 10 are screen images illustrating a method for creating content according to an embodiment of the present invention.

Referring to FIG. 3 to FIG. 10, the controller 100 operates the camera unit 150 according to an input signal for operating a camera function in step S301. The controller 100 executes a camera function in a camera mode, according to a user input. For example, as illustrated in FIG. 4, when the controller 100 detects a user input signal, a menu including "1. Normal mode" and "2. Composite mode" is displayed. The normal mode refers to a capture mode that allows a portable terminal to capture an image or a moving image, i.e., take a photograph or record a movie. The composite mode refers to a capture mode that allows a portable terminal to combine, in real time, a selected image with an image of an object captured using the camera.

Figure 5:
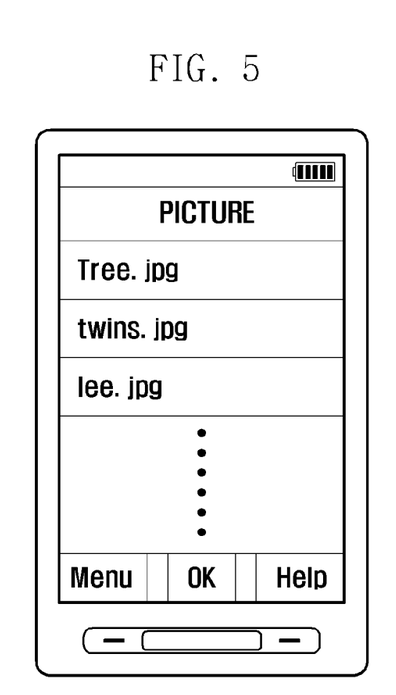

In step S303, the controller 100 detects a selection signal in a composite mode from the camera menu. In step S305, the controller 100 controls the camera unit 150 to provide image data with a preview screen. For example, the controller 100 can provide a list of images, which are stored in the storage unit 130, with a screen, and then display a particular image that is highlighted from the list by the user, on the preview screen. For example, as illustrated in FIG. 5, the controller 100 provides a list of images that are stored in the storage unit 130.

After reviewing the stored images, the user selects a particular image from the list in step S307. The controller 100 then reads the selected image from the storage unit 130 and displays it on the screen.

Figure 6:
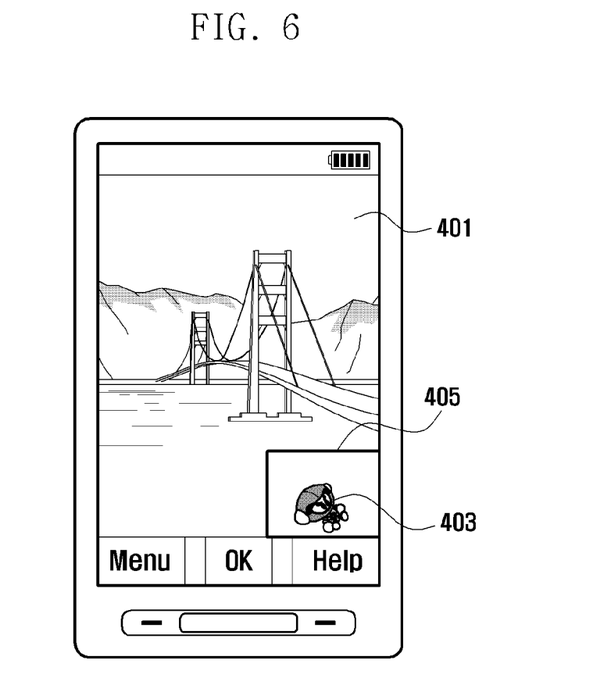

When the image is displayed, the controller 100 then captures a particular object from an image being received by the camera unit 150 in step S309. The controller 100 overlays and displays an image of the particular object recognized by the camera unit 150 on an auxiliary screen. For example, as illustrated in FIG. 6, the controller 100 displays the selected image 401 and the image of the particular object 403, together. Specifically, the image of the particular object 403 is displayed on an auxiliary screen 405 that is overlaid on the particular image 401. The auxiliary screen 405 is not fixed at a certain location on the screen of the display unit, and may moved to another area of the screen. The auxiliary screen 405 may also be enlarged or reduced via a zoom in/out function. According to the change in the size of the auxiliary screen 405, the size of the particular object 403 is variably displayed on the auxiliary screen 405.

Figure 7:
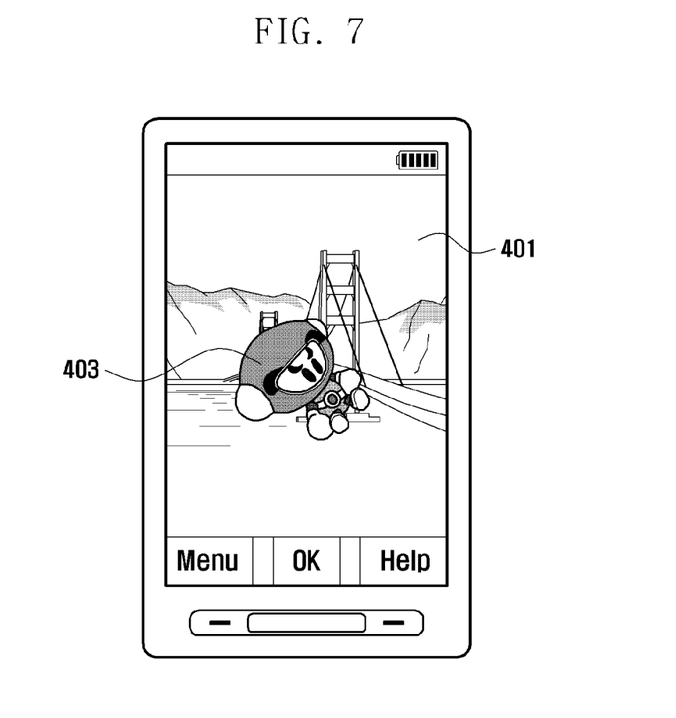

After capturing the image of the particular object at step S309, the controller 100 combines the image of the captured object with the selected image in step S311. Basically, the controller 100 controls the combining unit 104. The controller 100 overlays the captured image of the particular object on the selected image being displayed on the screen, as a preview screen in step S313. For example, as illustrated in FIG. 7, the controller 100 combines the image of the particular object 403 with the selected image 401 to display as new content. The image of the particular object 403 is overlaid and displayed on the selected image 401.

After displaying the preview screen in step S313, the controller 100 determines whether an 'OK' signal regarding the created content is input in step S315. When the controller 100 ascertains that an 'OK' signal regarding the created content is input in step S315, it stores the created content in the storage unit 130 in step S317.

However, when an 'OK' signal is not input in step S315, the controller 100 captures an image of an object again in step 309.

Figure 8:
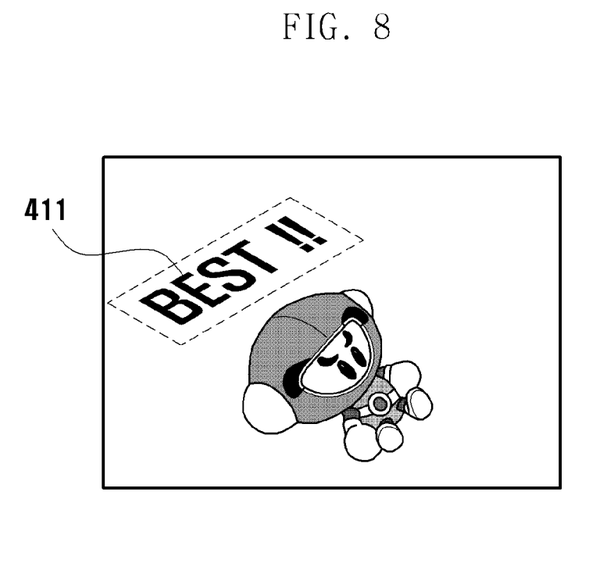
Figure 9:
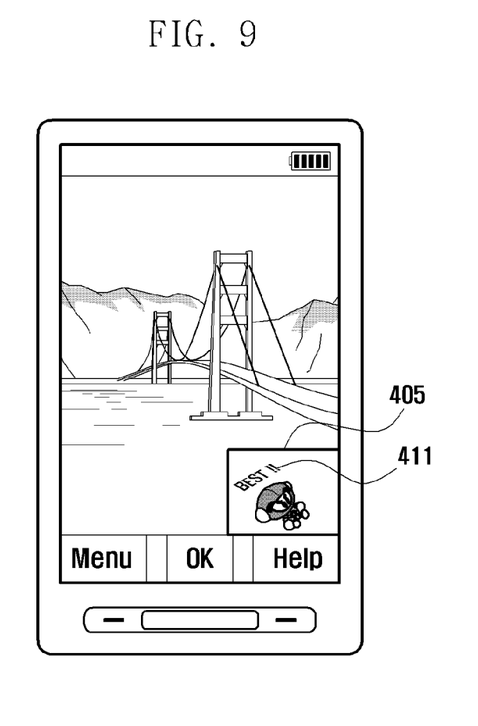

The controller 100 detects the movement of an object or changes in the character addition, etc., and captures an object again, in response to the detection. For example, as illustrated in FIG. 8, the controller 100 can detect the input of another object or an added word 'BEST !!' 411. As illustrated in FIG. 9, the controller 100 can also display the added word 'BEST !!' 411 on an auxiliary screen 405, together with the particular object.

Figure 10:
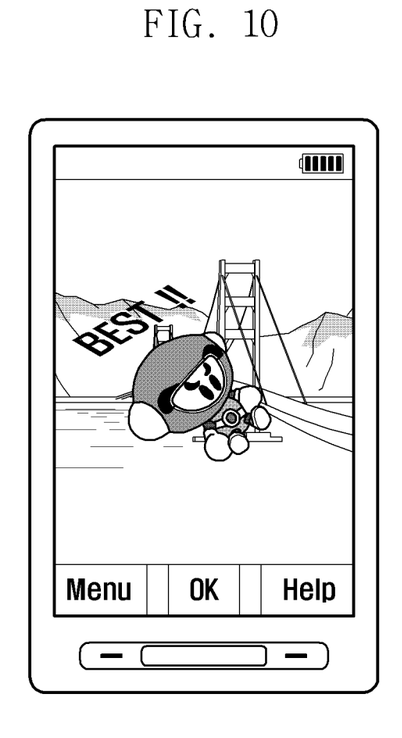

The controller 100 combines the added letters and the object with a selected image to create content, and displays the created content on the preview screen. For example, as illustrated in FIG. 10, the controller 100 combines the added letters and the object with the selected image to create new content, and displays the created content on the display unit 110.

After storing the created content in step S317, the controller 100 determines whether to transmit the created content in step S319. When an input signal for transmitting the created content is input, the controller 100 transmits the created content to others by MMS or via short-range wireless communication in step S321. However, when an input signal for transmitting the created content is not input, the controller 100 terminates the composite mode.

As described above, although the embodiments of the present invention have been described wherein an image of an object recognized via a camera is combined with a selected image, it should be understood that the present invention is not limited to these embodiments. For example, the present invention can also be applied to the composite between images corresponding to a plurality of objects with a selected image.

As described above, the embodiments of the present invention enable a user to easily edit content at a desired position on a display unit, and to express a handwriting style or painting style. The embodiments of the present invention also extend the content editing function provided to portable terminals having a touch function, to all digital devices with a camera. The embodiments of the present invention enable a user to, in real time, combine an captured image of an object received through a camera with a previously stored image.

Although certain embodiments of the present invention have been described in detail hereinabove, it should be understood that many variations and modifications of the basic inventive concept herein described, which may be apparent to those skilled in the art, will still fail within the spirit and scope of the present invention as defined in the appended claims and any equivalents thereof.

What is claimed is:

1. A method for creating content in a portable terminal, comprising:
    selecting a composite mode from a camera menu after executing a camera function;
    displaying an image selected by a user on a preview screen;
    capturing an image of at least one object that is recognized within an image being received by a camera in the portable terminal;
    extracting at least one object from image data input through the camera according to a compactness of pixels corresponding to an edge portion of each object recognized by the camera unit; and
    creating the content by combining the captured image of the at least one object with the image selected by the user.

2. The method of claim 1, wherein capturing the image of the at least one object comprises:
    displaying the at least one object on an auxiliary screen that is overlaid on the selected image; and
    detecting a signal requesting that the image of the at least one object being displayed be captured.

3. The method of claim 1, wherein capturing the image of the at least one object further comprises:
    detecting an object recognition mode as a plane recognition mode;
    identifying a compactness of pixels corresponding to an edge portion of the at least one object recognized by the camera; and
    detecting the at least one object according to an identification result.

4. The method of claim 1, wherein capturing the image of the at least one object further comprises:
    detecting an object recognition mode as a hue recognition mode;
    identifying a hue of each object recognized by the camera; and
    detecting the at least one object according to an identification result.

5. The method of claim 1, wherein creating the content comprises:
    displaying the created content on the preview screen.

6. The method of claim 5, further comprising:
    storing the created content displayed on the preview screen, when a storing request signal is detected.

7. The method of claim 1, further comprising:
    transmitting the created content via a multimedia message or short-range wireless communication.

8. The method of claim 2, wherein the auxiliary screen can be moved to another area of the preview screen.

9. The method of claim 2, wherein the auxiliary screen can be enlarged or reduced corresponding to a zoom in/out function.

10. The method of claim 2, wherein a size of the auxiliary screen can be changed.

11. The method of claim 10, wherein a size of the at least one object is variable according to a change of the size of the auxiliary screen.

12. A portable terminal for creating content, comprising:
    a camera unit for capturing an image of at least one object from an image being received by the camera unit when a composite mode from a camera menu is selected after executing a camera function;
    a display unit for displaying a selected image and the image of the at least one object captured by the camera unit on a preview screen; and
    a controller for creating the content by combining the captured image of the at least one object with the selected image,
    wherein the controller comprises:
    an object extracting unit for extracting at least one object from image data input through the camera; and
    a combining unit for combining the image of the at least one object with the selected image,
    wherein the object extracting unit extracts the at least one object according to a compactness of pixels corresponding to an edge portion of each object recognized by the camera unit.

13. The portable terminal of claim 12, wherein the controller detects a signal to request to capture the image of the at least one object.

14. The portable terminal of claim 12, wherein the object extracting unit extracts the at least one object by identifying a hue of each object recognized by the camera unit.

15. The portable terminal of claim 12, wherein the controller displays the created content on the preview screen.

16. The portable terminal of claim 12, further comprising: a storage unit for storing the created content.

17. The portable terminal of claim 12, further comprising a Radio Frequency (RF) communication unit for transmitting the created content via a multimedia message or short-range wireless communication.

18. The portable terminal of claim 12, wherein the display unit displays the image of the at least one object on an auxiliary screen that is overlaid on the preview screen.

* * * * *